US012585523B2

(12) United States Patent
Deng et al.

(10) Patent No.: US 12,585,523 B2
(45) Date of Patent: Mar. 24, 2026

(54) BUS ANOMALY DETECTING METHODS, PROCESSING METHODS, APPARATUSES, SYSTEM, DEVICE, AND MEDIUM

(71) Applicants:Beijing Youzhuju Network Technology Co., Ltd., Beijing (CN); Lemon Inc., Grand Cayman (KY)

(72) Inventors: Pengjie Deng, Beijing (CN); Qi Chen, Beijing (CN); Yimin Chen, Los Angeles, CA (US); Shan Lu, Los Angeles, CA (US); Jian Wang, Beijing (CN)

(73) Assignees: Beijing Youzhuju Network Technology Co., Ltd., Beijing (CN); Lemon Inc., Grand Cayman (KY)

( * ) Notice: Subject to any disclaimer, the term of this patent is extended or adjusted under 35 U.S.C. 154(b) by 0 days.

(21) Appl. No.: 18/660,919

(22) Filed: May 10, 2024

(65) Prior Publication Data

US 2024/0378103 A1 Nov. 14, 2024

(30) Foreign Application Priority Data

May 10, 2023 (CN) .......................... 202310524160.5

(51) Int. Cl.
*G06F 11/00* (2006.01)
*G06F 11/07* (2006.01)
(Continued)

(52) U.S. Cl.
CPC ...... *G06F 11/0772* (2013.01); *G06F 11/1016* (2013.01); *G06F 11/1438* (2013.01)

(58) Field of Classification Search
None
See application file for complete search history.

(56) References Cited

U.S. PATENT DOCUMENTS

| | | | |
|---|---|---|---|
| 5,724,609 A | 3/1998 | Hatae et al. | |
| 2002/0062459 A1* | 5/2002 | Lasserre | ............. G06F 12/0292 714/10 |

(Continued)

FOREIGN PATENT DOCUMENTS

| | | |
|---|---|---|
| CN | 1905070 A | 1/2007 |
| CN | 101311910 A | 11/2008 |

(Continued)

OTHER PUBLICATIONS

Google Scholar/Patents search—text refined (Year: 2024).*

(Continued)

*Primary Examiner* — Christopher S McCarthy

(57) ABSTRACT

A bus anomaly detecting method, processing method, apparatus, system, device, and medium. The bus anomaly detecting method includes: at an interface for connecting a bus, activating a detection state in response to an access initiating apparatus sending an access request to an access receiving apparatus so as to, in the detection state, perform anomaly detection on response signal fed back by the access receiving apparatus for each access request, and block an interruption signal sent by the access initiating apparatus; in response to a response signal corresponding to an access request having an anomaly, terminating the detection state, recording bus anomaly information, and sending an interruption signal; and in a case where the response signal corresponding to each access request sent by the access initiating apparatus is received and has no anomaly, terminating the detection state to stop blocking the interruption signal sent by the access initiating apparatus.

20 Claims, 6 Drawing Sheets

(51) Int. Cl.
      *G06F 11/10*        (2006.01)
      *G06F 11/14*        (2006.01)

(56) References Cited

U.S. PATENT DOCUMENTS

| | | | |
|---|---|---|---|
| 2017/0004063 A1 | 1/2017 | Broderick et al. | |
| 2017/0185469 A1* | 6/2017 | Obara | G06F 11/1456 |
| 2018/0018292 A1 | 1/2018 | Malipeddi et al. | |
| 2019/0324797 A1* | 10/2019 | Miao | G06F 9/52 |
| 2024/0103952 A1* | 3/2024 | Sonntag | G06F 11/076 |

FOREIGN PATENT DOCUMENTS

| | | |
|---|---|---|
| CN | 103186447 A | 7/2013 |
| CN | 103810074 A | 5/2014 |
| CN | 106708679 A | 5/2017 |
| CN | 109918230 A | 6/2019 |
| CN | 110716818 A | 1/2020 |
| CN | 113722166 A | 11/2021 |
| CN | 113742230 A | 12/2021 |
| CN | 113778734 A | 12/2021 |
| CN | 115617718 A | 1/2023 |
| CN | 115904798 A | 4/2023 |
| EP | 3683682 A1 | 7/2020 |
| JP | H0721767 B2 | 3/1995 |
| TW | 201702885 A | 1/2017 |

OTHER PUBLICATIONS

Google Scholar/Patents search—text refined (Year: 2025).*
International Search Report and Written Opinion received for PCT Patent Application No. PCT/CN2024/090572, mailed on Jul. 27, 2024, 10 pages (2 pages of English Translation and 8 pages of Original Document).
"NVDLA Index of Documentation", NVDLA, Retrieved from the link: "http://nvdla.org/contents.html", pp. 1-1.
Office action received from Taiwanese patent application No. 112117242 mailed on Jan. 22, 2024, 16 pages (5 pages English Translation and 11 pages Original Copy).
Extended EP Search Report dated Oct. 9, 2024 issued in EP Appl. No. 24175003.3, 11 pages.

\* cited by examiner

<u>1000</u>

BUS ANOMALY DETECTING METHODS, PROCESSING METHODS, APPARATUSES, SYSTEM, DEVICE, AND MEDIUM

CROSS-REFERENCE TO RELATED APPLICATION

The present application claims priority to Chinese patent application No. 202310524160.5 filed on May 10, 2023, the disclosure of which is incorporated by reference herein in its entirety as part of the present application.

TECHNICAL FIELD

Embodiments of the present disclosure relate to a bus anomaly detecting method and apparatus, a data processing apparatus, a bus anomaly processing method and apparatus, a processing system, an electronic device, and a storage medium.

BACKGROUND

A bus is a common communication trunk for transferring information between various functional components of a computer, and various functional components may transmit data through the bus. For example, a data processing component may send a read request to a storage component through the bus according to a data processing task, and the storage component feeds back a read result to the data processing component through the bus in response to the read request. The data processing component executes the data processing task based on the read data and stores a processing result to the storage component, and may then send an interruption signal to an upper-level component to inform of the upper-level component of the completion of the current data processing task.

SUMMARY

When various functional components are in access communication through a bus, an access anomaly may occur due to various reasons, resulting in computation errors of the functional components that cannot be found and processed in time. For the above problem, at least one embodiment of the present disclosure provides a bus anomaly detecting method and apparatus, a data processing apparatus, a bus anomaly processing method and apparatus, an electronic device, and a storage medium. Therefore, a response signal with an anomaly may be found and processed in time. The computation errors of the functional components may be avoided or reduced, and continuous running in the case of an error occurring may be avoided, thereby improving the reliability.

At least one embodiment of the present disclosure provides a bus anomaly detecting method, including: at an interface for connecting a bus, activating a detection state in response to at least one access initiating apparatus sending an access request to at least one access receiving apparatus so as to, in the detection state, perform anomaly detection on response signal fed back by the at least one access receiving apparatus for each access request, and block an interruption signal sent by the at least one access initiating apparatus with respect to a task corresponding to the access request; in response to the response signal corresponding to at least one access request sent by the at least one access initiating apparatus having an anomaly, terminating the detection state, recording bus anomaly information based on the response signal having the anomaly, and sending an interruption signal with respect to the response signal having the anomaly; and in a case where the response signal corresponding to each access request sent by the at least one access initiating apparatus is received and has no anomaly, terminating the detection state to stop blocking the interruption signal sent by the at least one access initiating apparatus.

At least one embodiment of the present disclosure provides a bus anomaly detecting apparatus, including a detection unit, a first processing unit and a second processing unit. The detection unit is configured to, at an interface for connecting a bus, activate a detection state in response to at least one access initiating apparatus sending an access request to at least one access receiving apparatus so as to, in the detection state, perform anomaly detection on response signal fed back by the at least one access receiving apparatus for each access request, and block an interruption signal sent by the at least one access initiating apparatus with respect to a task corresponding to the access request. The first processing unit is configured to, in response to the response signal corresponding to at least one access request sent by the at least one access initiating apparatus having an anomaly, terminate the detection state, record bus anomaly information based on the response signal having the anomaly, and send an interruption signal with respect to the response signal having the anomaly. The second processing unit is configured to, in a case where the response signal corresponding to each access request sent by the at least one access initiating apparatus is received and has no anomaly, terminate the detection state to stop blocking the interruption signal sent by the at least one access initiating apparatus.

At least one embodiment of the present disclosure provides a bus anomaly processing method, including: in response to receiving an interruption signal sent by the data processing apparatus according to any one of claims 8 to 10, determining whether bus anomaly information recorded for the data processing apparatus is present; and in a case where the bus anomaly information recorded for the data processing apparatus is present, resetting the data processing apparatus.

At least one embodiment of the present disclosure provides a bus anomaly processing apparatus, including an interruption response unit and a reset unit. The interruption response unit is configured to, in response to receiving an interruption signal sent by the data processing apparatus according to any one of claims 8 to 10, determine whether bus anomaly information recorded for the data processing apparatus is present. The reset unit is configured to, in a case where the bus anomaly information recorded for the data processing apparatus is present, reset the data processing apparatus.

At least one embodiment of the present disclosure provides a processing system, including a bus, the bus anomaly processing apparatus according to any one embodiment of the present disclosure, and the data processing apparatus according to any one embodiment of the present disclosure.

At least one embodiment of the present disclosure provides an electronic device, including a processor and a memory storing at least one computer program module; in which the at least one computer program module is configured to be executed by the processor to implement the bus anomaly detecting method according to any one embodiment of the present disclosure or to implement the bus anomaly processing method according to any one embodiment of the present disclosure.

At least one embodiment of the present disclosure provides a computer-readable storage medium, storing non-transitory computer-readable instructions which, when executed by a computer, cause implementing the bus anomaly detecting method according to any one embodiment of the present disclosure or implementing the bus anomaly processing method according to any one embodiment of the present disclosure.

BRIEF DESCRIPTION OF DRAWINGS

The above-described and other features, advantages and aspects of the respective embodiments of the present disclosure will become more apparent when taken in conjunction with the accompanying drawings and with reference to the detailed description below. Throughout the drawings, same reference signs refer to same elements. It should be understood that, the drawings are schematic and that originals and elements are not necessarily drawn to scale.

DETAILED DESCRIPTION

Figure 1:
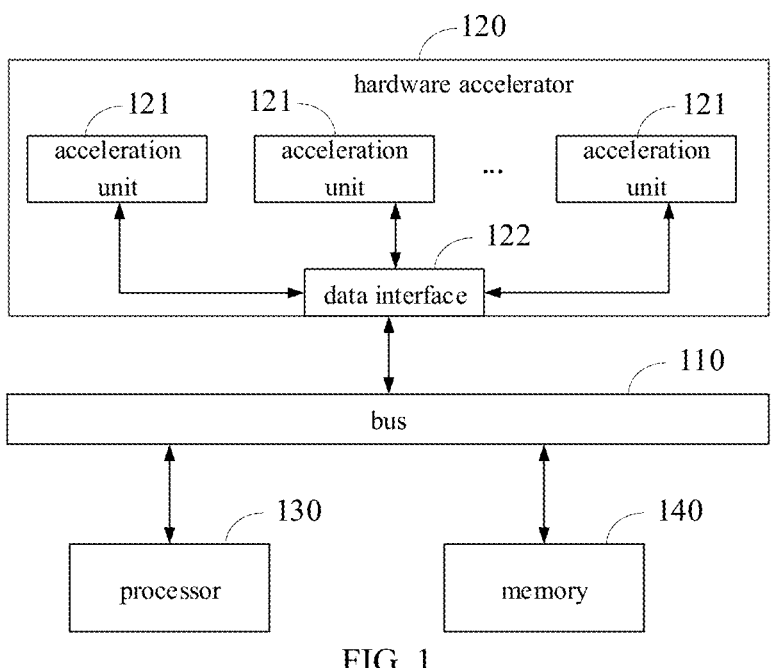
FIG. 1 is a schematic diagram of an electronic device.

Embodiments of the present disclosure will be described in more detail below with reference to the accompanying drawings. Although some embodiments of the present disclosure are shown in the drawings, it should be understood that the present disclosure may be embodied in various forms and should not be construed as limited to the embodiments set forth here, On the contrary, these embodiments are provided for a more thorough and complete understanding of the present disclosure. It should be understood that the drawings and the embodiments of the present disclosure are only for illustration purposes, and are not intended to limit the protection scope of the present disclosure.

It should be understood that the steps described in the method embodiments of the present disclosure may be performed in a different order and/or in parallel. In addition, the method embodiments may include additional steps and/or omit the steps shown. The scope of the present disclosure is not limited in this respect.

As used herein, the term "comprising" and its variations are open including, that is, "including but not limited to". The term "based on" means "at least partially based on". The term "one embodiment" means "at least one embodiment"; the term "another embodiment" means "at least one other embodiment"; and the term "some embodiments" means "at least some embodiments". Relevant definitions of other terms will be given in the following description.

It should be noted that the concepts of "first" and "second" mentioned in the disclosure are only used to distinguish devices, modules or units, and are not used to limit that these devices, modules or units must be different devices, modules or units, nor to limit the order or interdependence of the functions performed by these devices, modules or units.

It should be noted that the modification "one" and "a plurality" mentioned in this disclosure are illustrative rather than restrictive, and those skilled in the art should understand that unless the context clearly indicates otherwise, they should be understood as "one or more". "a plurality" should be understood to mean two or more.

The names of interactive messages or information between a plurality of devices in the embodiment of the present disclosure are for illustrative purposes only and should not restrict the scope of the messages or information.

FIG. 1 is a schematic diagram of an electronic device.

As shown in FIG. 1, taking a hardware accelerator 120 for example, the hardware accelerator 120 may include a plurality of acceleration units 121. For example, a neural network accelerator may include acceleration units such as a convolution core weight DMA (CDMA WT), a convolution core data DMA (CDMA DAT), a single data point processor (SDP), a planar data processor (PDP), a cross-channel data processor (CDP), and a bridge DMA (BDMA), where DMA represents a direct memory access apparatus.

For example, a processor 130 may configure a register of the hardware accelerator 120 by using software, e.g., unload a task (e.g., a computation task) into the register of the hardware accelerator 120 through a bus 110. The processor 130 may be, for example, an apparatus such as a central processing unit (CPU) or a graphics processing unit (GPU). Each acceleration unit 121 in the hardware accelerator 120 obtains corresponding data from a memory 140 through the bus 110 according to the configuration of the software. The memory 140 may be, for example, a dynamic random access memory (DRAM) or a system level cache (SLC). After obtaining the data from the memory 140, each acceleration unit 121 may compute the obtained data and writes a computation result back to the memory 140 through the bus 110. After completing an assigned computation task, each acceleration unit 121 may pull up an interruption signal to inform the processor 130 that the acceleration calculation is completed and the next step of calculation may be executed. For example, in some embodiments, each acceleration unit 121 in the hardware accelerator 120 may also communicate with other apparatuses or devices besides the processor and the memory through the bus 110.

For example, in the above process, each acceleration unit 121 in the hardware accelerator 120 may be connected to the bus 110 through a data interface 122 and thus perform data interaction with a device such as the memory 140 through the bus 110. The data interface 122 may be, for example, an ACE-Lite bus interface, where ACE represents AXI Coherency Extensions, and AXI represents Advanced extensible Interface. When each acceleration unit 121 in the hardware accelerator 120 is running, there may be various anomalies. For example, in communication with an external device such as the memory 140 through the bus 110, an anomaly may occur due to various reasons, resulting a computation error or hang of the hardware accelerator that cannot be found and processed in time.

At least one embodiment of the present disclosure provides a bus anomaly detecting method and apparatus, a data processing apparatus, a bus anomaly processing method and apparatus, an electronic device, and a storage medium. After an access request sent is monitored, a detection state is activated to start detecting a returned response signal. In a case where an anomaly is detected, the anomaly is recorded and an interruption signal is sent. A response signal with an anomaly may be found in time and the device such as the processor may be informed of processing the anomaly. The computation errors or hangs of an access initiating apparatus may be avoided or reduced. Moreover, in the detection state, each access initiating apparatus may be prevented from sending the interruption signal. After confirming that all response signals are returned and pass detection, blocking of the interruption signal sent by each access initiating apparatus is released. The device such as the processor may be informed of the completion of current task processing in the case of guaranteeing that the read operation and the write operation of each initiating apparatus are correct, and then performs next step of computation. Continuous running in the case of an error occurring may be avoided, thereby improving the reliability.

Embodiments of the present disclosure will be described below in detail with reference to the accompanying drawings.

At least one embodiment of the present disclosure provides a bus anomaly detecting method, including: at an interface for connecting a bus, activating a detection state in response to at least one access initiating apparatus sending an access request to at least one access receiving apparatus so as to, in the detection state, perform anomaly detection on response signal fed back by the at least one access receiving apparatus for each access request, and block an interruption signal sent by the at least one access initiating apparatus with respect to a task corresponding to the access request; in response to the response signal corresponding to at least one access request sent by the at least one access initiating apparatus having an anomaly, terminating the detection state, recording bus anomaly information based on the response signal having the anomaly, and sending an interruption signal with respect to the response signal having the anomaly; and in a case where the response signal corresponding to each access request sent by the at least one access initiating apparatus is received and has no anomaly, terminating the detection state to stop blocking the interruption signal sent by the access initiating apparatus.

Figure 2:
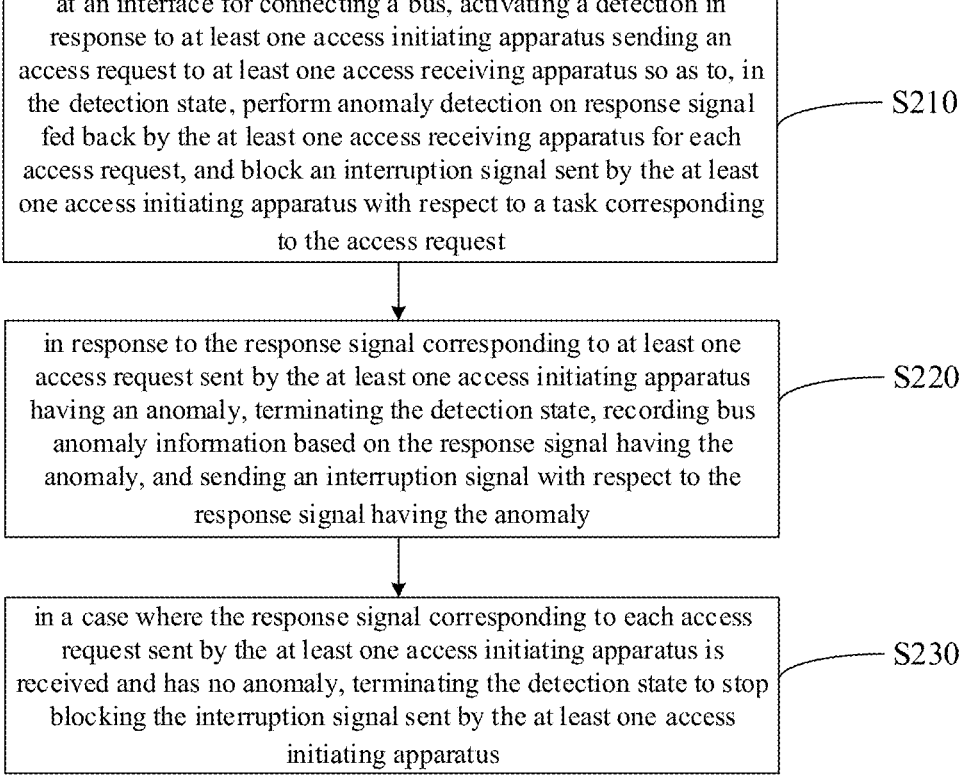
FIG. 2 is a flowchart of a bus anomaly detecting method provided in some embodiments of the present disclosure.

FIG. 2 is a flowchart of a bus anomaly detecting method provided in some embodiments of the present disclosure. As shown in FIG. 2, in at least one embodiment, the bus anomaly detecting method includes the following operations.

At step S210: at an interface for connecting a bus, activating a detection in response to at least one access initiating apparatus sending an access request to at least one access receiving apparatus so as to, in the detection state, perform anomaly detection on response signal fed back by the at least one access receiving apparatus for each access request, and block an interruption signal sent by the at least one access initiating apparatus with respect to a task corresponding to the access request.

At step S220: in response to the response signal corresponding to at least one access request sent by the at least one access initiating apparatus having an anomaly, terminating the detection state, recording bus anomaly information based on the response signal having the anomaly, and sending an interruption signal with respect to the response signal having the anomaly.

At step S230: in a case where the response signal corresponding to each access request sent by the at least one access initiating apparatus is received and has no anomaly, terminating the detection state to stop blocking the interruption signal sent by the at least one access initiating apparatus.

Figure 3:
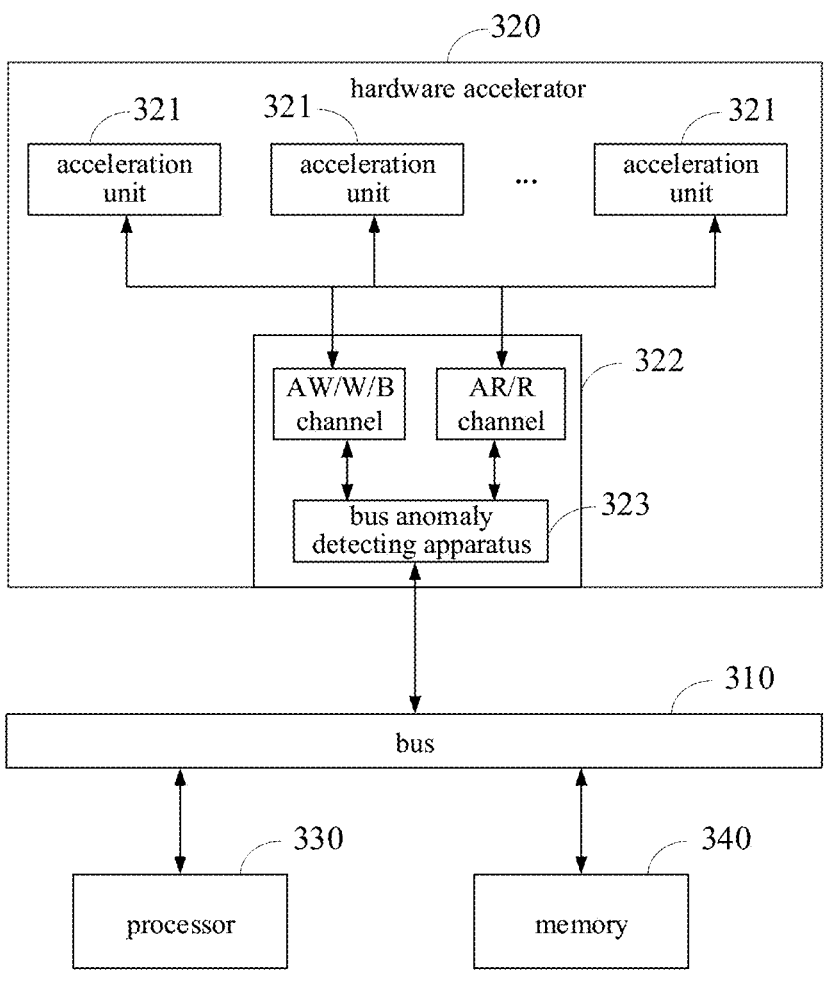
FIG. 3 is schematic diagram of an electronic device provided in some embodiments of the present disclosure.

FIG. 3 is schematic diagram of an electronic device provided in some embodiments of the present disclosure.

As shown in FIG. 3, a bus anomaly detecting apparatus 323 may be disposed at an interface 322 of a hardware accelerator 320 that is used of connecting a bus. The bus anomaly detecting method of at least one embodiment of the present disclosure may be performed by the bus anomaly detecting apparatus 323.

For example, in step S210, the at least one access initiating apparatus may include at least one acceleration unit of the hardware accelerator. The hardware accelerator may include, for example, a neutral network accelerator. The access receiving apparatus may include a memory. The memory may include, for example, a dynamic random access memory or a system level cache. However, the present disclosure is not limited thereto. The bus anomaly detecting method of the embodiments of the present disclosure may also be applied to a scenario in which other apparatuses and devices (e.g., a processor and a controller) initiate access requests outwards. In the following embodiments of the present disclosure, the descriptions are made by taking for example that the access initiating apparatus is the acceleration unit of the hardware accelerator and the access receiving apparatus is the memory.

For example, a processor 330 may send a computation task to the hardware accelerator 320 through a bus 310, and each acceleration unit 321 of the hardware accelerator 320 may send a read request to the memory 340 through the bus 310 according to the computation task. The memory 340 reads, in response to the read request, computational data required by the computation task according to a destination address of the read request, and feeds back the computational data to the acceleration unit 321 through the bus 310. After completing accelerated computation based on the computational data, the acceleration unit 321 may send a write request to the memory 340 through the bus 310. The write request includes computation result data that needs to be written to the memory 340. The memory 340 writes, in response to the write request, the computation result data at a destination address of the write request, and feeds back a write operation result to the acceleration unit 321 through the bus 310. After receiving the write operation result, the acceleration unit 321 may send an interruption signal to the processor 330 so as to inform the processor 330 of the completion of the current computation task, and next computation task may be executed.

For example, the bus may include a first channel for transmitting the write request, a second channel for transmitting data to be written, a third channel for transmitting response signal corresponding to the write request, a fourth channel for transmitting the read request, and a fifth channel for transmitting response signal corresponding to the read request. In some embodiments below, the response signal corresponding to the write request is also referred to as response signal of the write request for short, and the response signal corresponding to the read request is also referred to as response signal of the read request for short.

For example, as shown in FIG. 3, the bus may include 5 channels: AW channel, W channel, B channel, AR channel, and R channel. The AW/W/B channels are used for the write operation, and the AW channel is used for sending the write request information and may be used as the first channel described above. The W channel is used for sending data to be written and may be used as the second channel described above. The B channel is used for transmitting the response signal (i.e., the response signal of the write request) returned by the access receiving apparatus after processing the write request and may be used as the third channel described above. The response signal of the write request may include a write response state signal (bresp) that is used for representing whether the request access receiving apparatus correctly processes the write request. The AR channel and the R channel are used for the read operation, and the AR channel is used for transmitting the read request and may be used as the fourth channel described above. The R channel is used for transmitting the response signal (i.e., the response signal of the read request) returned by the access receiving apparatus after processing the read request. The response signal of the read request includes read data (rdata), error information (rpoison), and a read response state signal (rresp). The R channel may be used as the fifth channel described above.

For example, the access request sent by the at least one access initiating apparatus to the at least one access receiving apparatus in step S210 may include the read request and/or the write request. The response signal fed back by the at least one access receiving apparatus for each access request in step S210 may include the response signal of the read request and/or the response signal of the write request.

For example, the bus anomaly detecting apparatus 323 may monitor each access request sent by the acceleration unit 321 to the apparatus such as the memory 340 and may receive the response signal corresponding to each access request.

For example, in an idle state, in response to the at least one access initiating apparatus sending the access request to the at least one access receiving apparatus, the state of the bus anomaly detection device transitions to the detection state. For example, the bus anomaly detecting apparatus 323 may have a plurality of working states, including the idle state, the detection state, an abnormal state, etc. In the idle state, the bus anomaly detecting apparatus 323 may enter into the detection state upon detecting that the acceleration unit 321 sends at least one access request outwards. In the detection state, the bus anomaly detecting apparatus 323 may wait for the response signal corresponding to each access request sent by the acceleration unit 321 and perform anomaly detection on each response signal after receiving the response signal. For example, in the detection state, the bus anomaly detecting apparatus 323 may wait for response signals returned by the third channel and the fifth channel and perform anomaly detection on the response signals from the third channel and the fifth channel.

Figure 4:
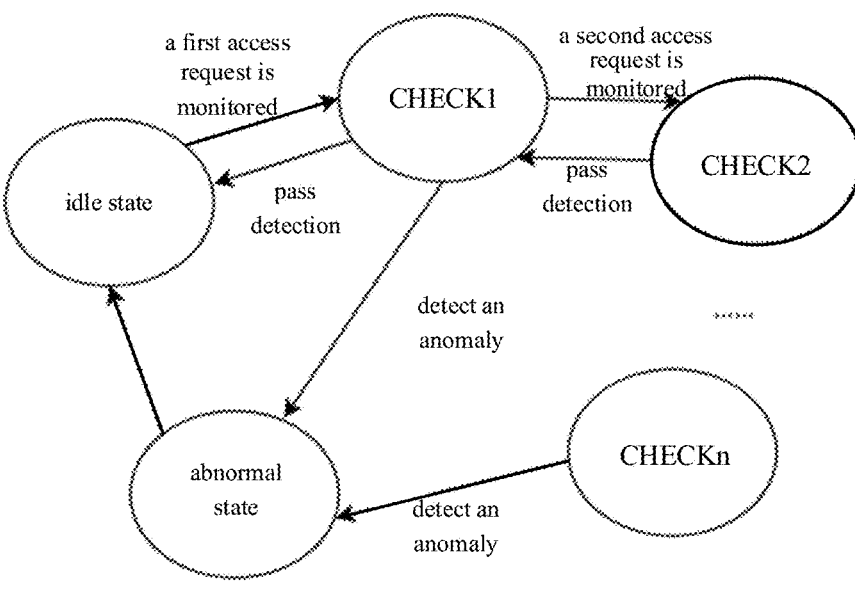
FIG. 4 is a schematic diagram of state changing provided in some embodiments of the present disclosure.

FIG. 4 is a schematic diagram of state changing provided in some embodiments of the present disclosure.

As shown in FIG. 4, the bus anomaly detecting apparatus 323 may monitor the read/write channel and enter into the detection state upon detecting an access request in the idle state. The detection state may include, for example, a plurality of sub-states (CHECK1 to CHECKn, n being a positive integer). When a first access request is monitored, the CHECK1 sub-state is activated, and then the bus anomaly detecting apparatus is switched to next sub-state whenever a new access request is received. For example, when a second access request is monitored, the bus anomaly detecting apparatus is switched to the CHECK2 sub-state from the CHECK1 sub-state, and when a third access request is monitored, the bus anomaly detecting apparatus is switched to the CHECK3 sub-state from the CHECK2 sub-state. The nth sub-state represents currently detecting that n access requests have been sent and also represents that n response signals currently need to be received and detected. During monitoring of the access request, the bus anomaly detecting apparatus 323 simultaneously receives response signals sent back by the bus and detects each received response signal. Whenever a response signal passes detection (i.e., having no anomaly), the bus anomaly detecting apparatus is switched to a previous sub-state. For example, in a case where a response signal is received in the CHECKn sub-state and passes detection, the bus anomaly detecting apparatus is switched to the CHECK(n−1) sub-state from the CHECKn sub-state; and in a case where a response signal is received in the CHECK(n−1) sub-state and passes detection, the bus anomaly detecting apparatus is switched to the CHECK(n−2) sub-state from the CHECK (n−1) sub-state.

For example, in step S220, in a case where the response signal corresponding to at least one access request sent by the at least one access initiating apparatus has an anomaly, the detection state is terminated and switched to the abnormal state. For example, as shown in FIG. 4, in a case where the bus anomaly detecting apparatus 323 receives a response signal in the CHECK(n−2) state and detects an anomaly from the response signal, the state is switched to the abnormal state, and in the abnormal state, the interruption signal is sent to the processor 330 with respect to the response signal having the anomaly.

For example, in step S230, in a case where the response signal corresponding to each access request sent by the at least one access initiating apparatus is received and has no anomaly, the detection state is terminated and returned to the idle state. For example, as shown in FIG. 4, in a case where the response signal corresponding to each access request sent passes detection, the bus anomaly detecting apparatus 323 may be sequentially switched from the CHECKn state to the CHECK1 state and from the CHECK1 state to the idle state. Therefore, the idle state is a state in which the response signals corresponding to the access requests sent by the at least one access initiating apparatus are received and detected as having no anomaly and no new access request is sent.

For example, after the detection state is returned to the idle state, when a new access request is monitored again in the idle state, the bus anomaly detecting method of the embodiments of the present disclosure may be performed again.

For example, the anomaly present in the response signal corresponding to the access request may include: an anomaly triggered in a response signal due to an access address of the access request not meeting a requirement; and/or an anomaly triggered in the response signal due to data read by the at least one access receiving apparatus in response to the read request having an error.

For example, the B channel and the R channel respectively includes a write response state signal (bresp) and a read response state signal (rresp). When SLVERR (slave error) or DECERR (decoding error) occurs in any one of the two signals, it indicates that an anomaly occurs in the response signal. This anomaly may occur when the access address of the access request does not meet the requirement, e.g., when the access address is invalid.

For example, the signal of the R channel may include the error signal (rpoison). When the error signal is an abnormal level (e.g., a high level), it indicates that data of a number of (e.g., 8) bits corresponding to the error signal has an error. When the access receiving apparatus (e.g., the memory) finds out that the read data has an error, the error signal may be caused to jump to the abnormal level, indicating that the read data has an error.

For example, in the abnormal state, the bus anomaly detecting apparatus 323 may also record the bus anomaly information. For example, an anomaly recording memory may be disposed correspondingly to each access initiating apparatus. When the response signal with an anomaly is detected, the access initiating apparatus corresponding to the response signal having the anomaly may be determined firstly as a target access initiating apparatus, and then an anomaly parameter is written to the anomaly recording memory corresponding to the target access initiating apparatus to characterize the occurrence of an anomaly in the response signal corresponding to the access request sent by the target access initiating apparatus.

For example, different identifications (ID) may be set for different acceleration units in the hardware accelerator, and a memory for recording an anomaly (which may be implemented as a register for example) may be disposed correspondingly to each acceleration unit. The anomaly recording memory may be located in the hardware accelerator or may be located outside the hardware accelerator. When the bus anomaly detecting apparatus 323 detects that a certain response signal has an anomaly, the corresponding acceleration unit may be firstly localized according to an acceleration unit identification in the response signal, and then the anomaly parameter is written to the anomaly recording memory corresponding to the acceleration unit. For example, a bit for characterizing an anomaly in the anomaly recording memory is set to 1 to realize localization of the acceleration unit having an anomaly for facilitating subsequent processing.

For example, a memory for recording an anomaly (which may be implemented as a register for example) may also be disposed correspondingly to the hardware accelerator. The memory may be located in the hardware accelerator or may be located outside the hardware accelerator. When the bus anomaly detecting apparatus 323 detects that a certain response signal received by the hardware accelerator has an anomaly, the anomaly parameter may be written to the anomaly recording memory corresponding to the hardware accelerator. For example, the bit for characterizing the anomaly is set to 1, and subsequently, whether the hardware accelerator has an anomaly may be determined by querying the memory.

For example, the bus anomaly detecting apparatus 323 may reflect whether there is a case in which response signal is not returned for a long time, in addition to detecting whether each response signal received from the bus has an anomaly. For example, in a case where the bus anomaly detecting apparatus 323 is maintained in the detection state for a long time (i.e., not changed to the idle state or the abnormal state for a long time), it indicates that the response signal corresponding to an access request is not returned for a long time.

For example, in some other embodiments, in a case where the bus anomaly detecting apparatus 323 detects that it is in the detection state for a long time (a predetermined duration), this case may also be recorded as an anomaly or an interruption signal is sent to the processor.

For example, in the detection state, the bus anomaly detecting apparatus 323 may block interruption signals sent to the processor 330 by each acceleration unit with respect to the tasks corresponding to the access request. After the response signals corresponding to all access requests sent are returned and pass detection, the bus anomaly detecting apparatus 323 may release the blocking of the interruption signal sent by each acceleration unit.

For example, in the abnormal state, the bus anomaly detecting apparatus 323 may send the interruption signal to the processor to inform the processor of processing the anomaly of the hardware accelerator.

Figure 5:
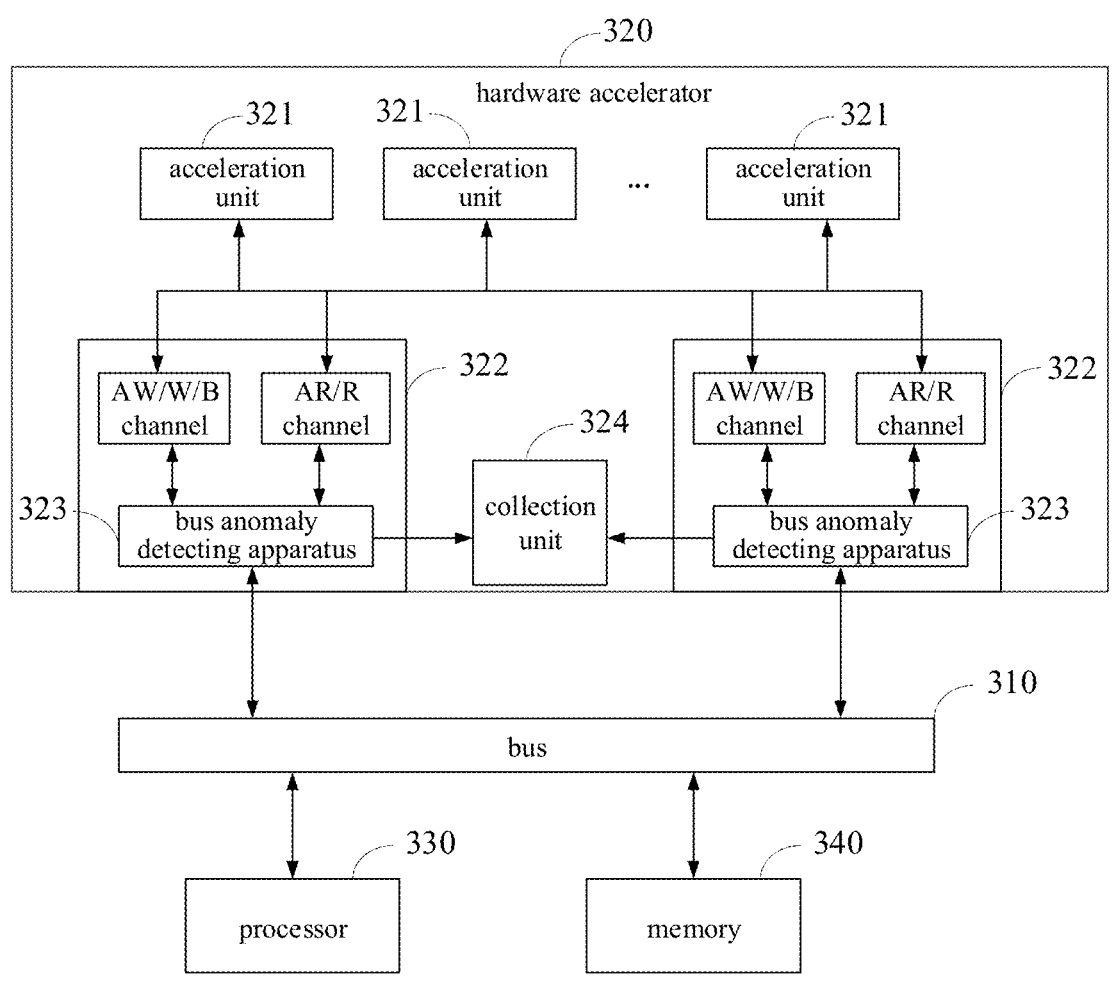
FIG. 5 is schematic diagram of another electronic device provided in some embodiments of the present disclosure.

FIG. 5 is schematic diagram of another electronic device provided in some embodiments of the present disclosure.

As shown in FIG. 5, two or more interfaces 322 may be disposed for the bus anomaly detecting apparatus 323, and each interface 322 may include the bus anomaly detecting apparatus 323. A data length of a single access request processed by a different interface may be different, and each acceleration unit 321 may send the access request to the corresponding interface 322 according to the data length of the access request. The bus anomaly detecting apparatus 323 may further include a collection unit 324. The collection unit 324 may collect a state of the bus anomaly detecting apparatus 323 in each interface and initiate an interruption for the processor in the abnormal state.

According to at least one embodiment of the present disclosure, after the access request sent is monitored, the detection state is activated to start detecting the returned response signal. In a case where an anomaly is detected, the anomaly is recorded and an interruption signal is sent. A response signal with an anomaly may be found in time and the apparatus such as the processor may be informed of processing the anomaly. The computation errors or hangs of an access initiating apparatus may be avoided or reduced.

According to at least one embodiment of the present disclosure, in the detection state, each access initiating apparatus may be prevented from sending the interruption signal. After confirming that all response signals are returned and pass detection, blocking of the interruption signal sent by each access initiating apparatus is released. The apparatus such as the processor may be informed of the completion of current task processing in the case of guaranteeing that the read operation and the write operation of each initiating apparatus are correct, and then performs next step of computation. Continuous running in the case of an error occurring may be avoided, thereby improving the reliability.

According to at least one embodiment of the present disclosure, by setting the detection state, an anomaly that a response signal is not returned for a long time can be reflected.

According to at least one embodiment of the present disclosure, the access initiating apparatus may be a hardware accelerator and can realize anomaly detection on the response signal received by the hardware accelerator.

According to at least one embodiment of the present disclosure, according to the response signal with the anomaly, the anomaly parameter is recorded in the anomaly recording memory corresponding to the target access initiating apparatus so that localization of the access initiating apparatus having an anomaly can be realized for facilitating subsequent processing.

According to at least one embodiment of the present disclosure, an abnormal signal may be detected accurately and rapidly by detecting the response signals transmitted by the third channel and the fifth channel.

It needs to be noted that, in the embodiments of the present disclosure, the order of performing the steps of the bus anomaly detecting method is not limited. While the performing process of the steps is described above in a particular order, the embodiments of the present disclosure are not limited thereto. The steps in the bus anomaly detecting method may be performed in series or in parallel, which may be set according to actual needs. The bus anomaly detecting method may further include more or less steps.

Figure 6:
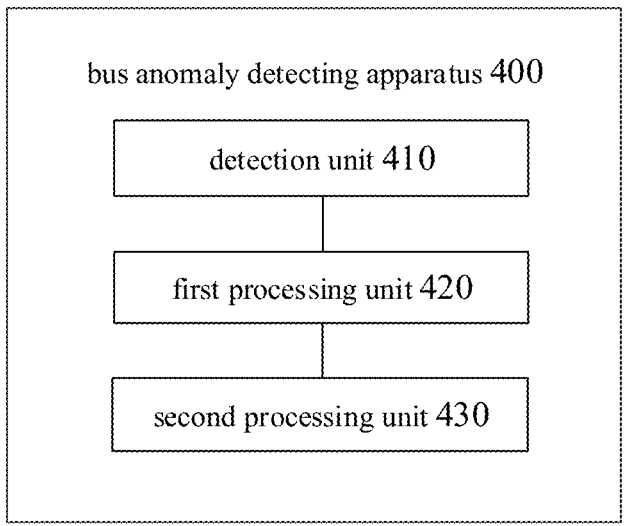
FIG. 6 is a schematic block diagram of a bus anomaly detecting apparatus provided in some embodiments of the present disclosure.

At least one embodiment of the present disclosure further provides a bus anomaly detecting apparatus. FIG. 6 is a schematic block diagram of a bus anomaly detecting apparatus provided in some embodiments of the present disclosure. As shown in FIG. 6, the bus anomaly detecting apparatus 400 includes a detection unit 410, a first processing unit 420, and a second processing unit 430.

The detection unit 410 is configured to, at an interface for connecting a bus, activate a detection state in response to at least one access initiating apparatus sending an access request to at least one access receiving apparatus so as to, in the detection state, perform anomaly detection on response signal fed back by least one access receiving apparatus for each access request, and block an interruption signal sent by the at least one access initiating apparatus with respect to a task corresponding to the access request. For example, the detection unit 410 may perform step S210 of the bus anomaly detecting method as shown in FIG. 2.

The first processing unit 420 is configured to, in response to the response signal corresponding to at least one access request sent by the at least one access initiating apparatus having an anomaly, terminate the detection state, record bus anomaly information based on the response signal having the anomaly, and send an interruption signal with respect to the response signal having the anomaly. For example, the first processing unit 420 may perform step S220 of the bus anomaly detecting method as shown in FIG. 2.

The second processing unit 430 is configured to, in a case where the response signal corresponding to each access request sent by the at least one access initiating apparatus is received and has no anomaly, terminate the detection state to stop blocking the interruption signal sent by the access initiating apparatus. For example, the second processing unit 430 may perform step S230 of the bus anomaly detecting method as shown in FIG. 2.

For example, the detection unit 410, the first processing unit 420, and the second processing unit 430 may be hardware, software, firmware, and any feasible combination thereof. For example, the detection unit 410, the first processing unit 420, and the second processing unit 430 may be special purpose or general purpose circuits, chips or apparatuses, and may also be a combination of a processor and a memory. The embodiments of the present disclosure have no particular limitation on the specific implementation forms of the detection unit 410, the first processing unit 420, and the second processing unit 430.

It needs to be noted that, in the embodiments of the present disclosure, the units of the bus anomaly detecting apparatus 400 correspond to the steps of the bus anomaly detecting method described above. Specific functions of the bus anomaly detecting apparatus 400 may be known with reference to the related descriptions regarding the bus anomaly detecting method described above, which will not be described here redundantly. The components and structures of the bus anomaly detecting apparatus 400 shown in FIG. 6 are merely exemplary and non-limiting. As needed, the bus anomaly detecting apparatus 400 may further include other components and structures.

At least one embodiment of the present disclosure further provides a data processing apparatus. The data processing apparatus includes at least one data processing unit configured to send an access request to at least one storage apparatus based on a received task, and a bus anomaly detecting apparatus.

For example, the data processing apparatus may include a hardware accelerator; and the data processing unit may include an acceleration unit.

For example, for the data processing apparatus, a reference may be made to the related descriptions regarding the hardware accelerator 320 in any above embodiment; for the bus anomaly detecting apparatus, a reference may be made to the related descriptions regarding the bus anomaly detecting apparatus 323 in any above embodiment; and for the data processing unit, a reference may be made to the related descriptions regarding the access initiating apparatus and the acceleration unit 321 in any above embodiment, which will not be described here redundantly.

For example, the data processing apparatus may further include a data memory configured to store computational data of at least one data processing unit and a check unit configured to check and correct data output by the data memory.

Figure 7:
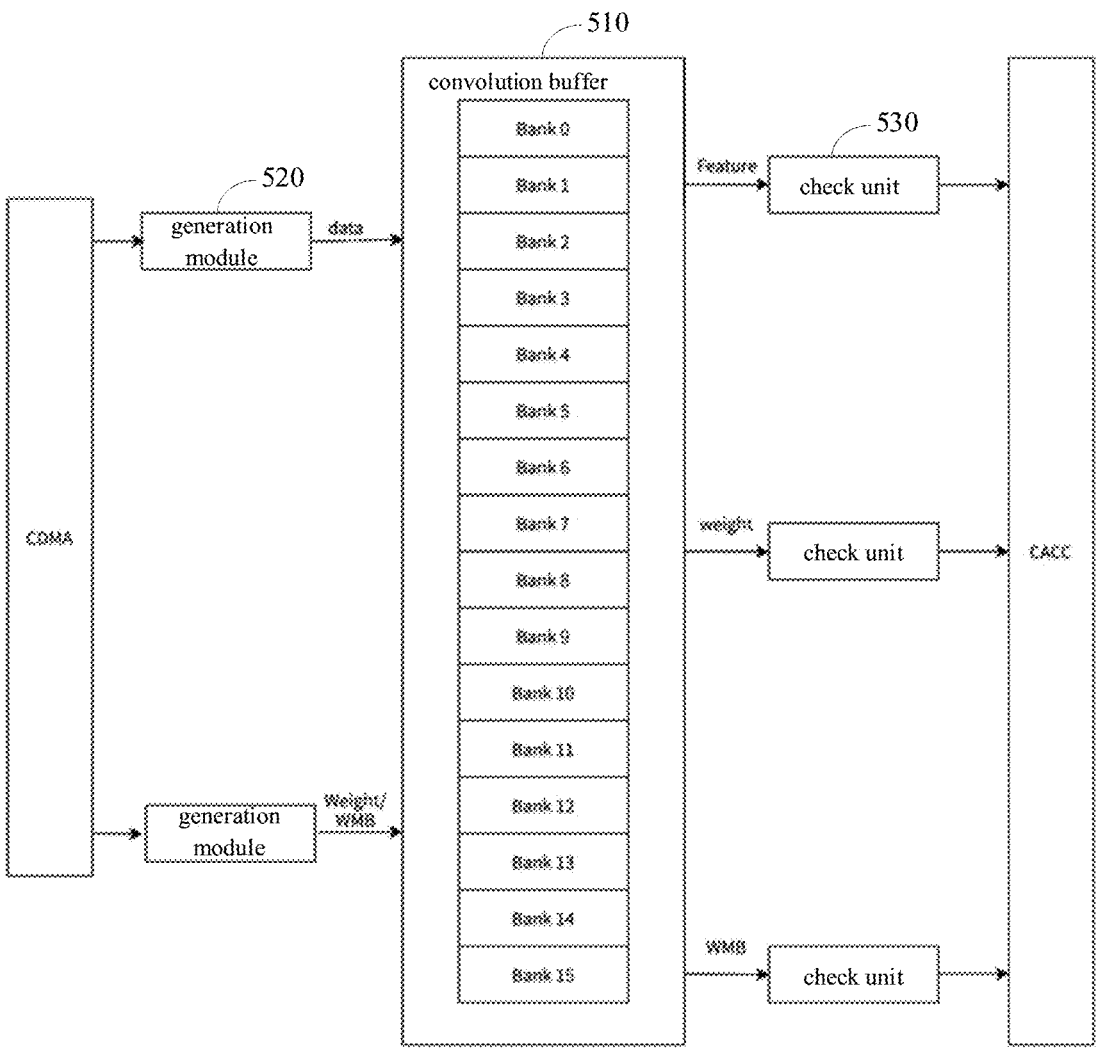
FIG. 7 is a schematic diagram of a data memory and a check unit provided in some embodiments of the present disclosure.

FIG. 7 is a schematic diagram of a data memory and a check unit provided in some embodiments of the present disclosure.

As shown in FIG. 7, the data memory may be a convolution buffer (CBUF) 510 that may be configured to buffer convolution data (e.g., a feature map), weights, and the like and may reduce excessive read of frequently used data from an external memory. The convolution buffer may be located at the second level of a convolution core. The convolution buffer may be implemented as a static random-access memory (SRAM), e.g., a 512 KB SRAM, which is organized as 16 banks, each bank being 32 KB. The convolution buffer may have two input ports and three output ports.

For example, at least one embodiment of the present disclosure adds an error correcting code (ECC) protection function for the convolution buffer 510. An ECC check code is generated by a generation module 520 (e.g., ECC GEN) at an input port of the convolution buffer 510, and the generated check code is stored together with data in the convolution buffer 510. WMB in FIG. 7 represents a weight mask bit. An ECC check is performed by the check unit 530 at an output port of the convolution buffer 510. By the ECC check, a single-bit error (Correctable ERROR, CE ERROR) may be found and corrected, and a multiple-bit (Uncorrectable ERROR, UC ERROR) error may also be found. For the UC ERROR, an address thereof in the convolution buffer 510 may be recorded, and an interruption is sent to the processor. For the CE ERROR, a bit having an error may be corrected. By performing ECC detection and correction on the convolution buffer 510, the data in the convolution buffer 510 may be protected; data errors may be reduced or avoided; and thus, a computation error caused by a data error can be avoided, improving the reliability.

Figure 8:
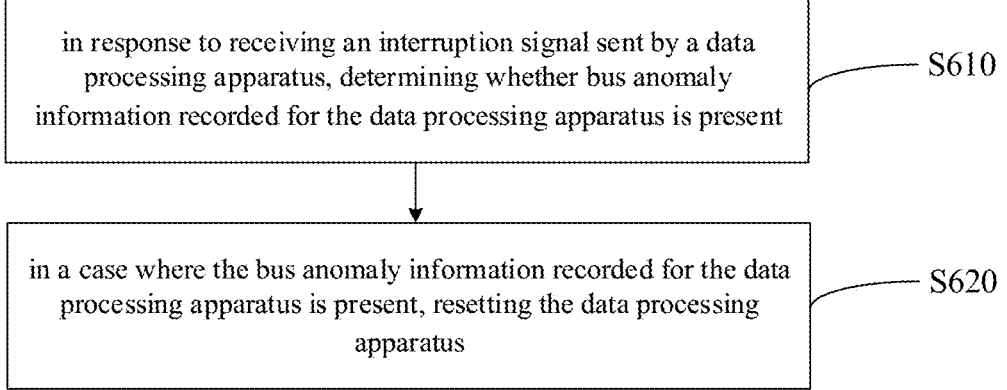
FIG. 8 is a flowchart of a bus anomaly processing method provided in some embodiments of the present disclosure.

At least one embodiment of the present disclosure further provides a bus anomaly processing method. FIG. 8 is a flowchart of a bus anomaly processing method provided in some embodiments of the present disclosure. As shown in FIG. 8, in at least one embodiment, the bus anomaly processing method includes the following operations.

At step S610: in response to receiving an interruption signal sent by a data processing apparatus, determining whether bus anomaly information recorded for the data processing apparatus is present.

At step S620: in a case where the bus anomaly information recorded for the data processing apparatus is present, resetting the data processing apparatus.

For example, the bus anomaly processing method may be performed by the processor 330 shown in FIG. 3 and FIG. 5. The data processing apparatus may be, for example, the hardware accelerator 320 shown in FIG. 3 and FIG. 5. When the hardware accelerator detects that a response signal has an anomaly, the hardware accelerator sends the interruption signal to the processor 330. After the processor 330 receives the interruption signal, the processor 330 may check whether the anomaly parameter is recorded in the anomaly recording memory corresponding to the hardware accelerator 320 firstly. If yes, it indicates that the hardware accelerator 320 has an anomaly, and the hardware accelerator 320 may be reset. The processor 330 may also check the anomaly recording memory corresponding to each acceleration unit to determine which each acceleration unit has an anomaly.

According to at least one embodiment of the present disclosure, after the interruption signal sent by the data processing apparatus is received, whether the data processing apparatus has an anomaly is checked, and the data processing apparatus is reset when the anomaly occurs. The anomaly of the data processing apparatus can be processed in time; the computation errors or hangs of the data processing apparatus can be avoided or reduced; and the correctness of subsequent computation can be guaranteed.

For example, resetting the data processing apparatus may include: resetting the data processing apparatus after the data processing unit of the data processing apparatus completes a current task; and after the resetting, reloading a task corresponding to a response signal having an anomaly to the data processing apparatus.

For example, in a case where it is detected that a response signal corresponding to a first acceleration unit has an error, the hardware accelerator 320 may be reset after other acceleration units complete processing of current ongoing tasks. For example, a reset signal of the hardware accelerator may be pulled up and released after being held for a period of time. After the resetting, the task having the anomaly may be reloaded to the register of the hardware accelerator 320 to allow the first acceleration unit to process the task again. Since an error of a response signal may be caused by software configuring a wrong address and the like, or an error occurs due to an accidental failure of the system, the problem may be solved by performing the resetting operation and re-performing the task again.

For example, the bus anomaly processing method may further include: in response to not receiving the interruption signal sent by the data processing apparatus within a predetermined duration, checking whether a current state of a bus anomaly detecting apparatus of the data processing apparatus is the detection state; and in a case where the current state of the bus anomaly detecting apparatus of the data processing apparatus is the detection state, resetting a processing system in which the data process apparatus resides. The predetermined duration may be set as needed, and is not limited in the embodiments of the present disclosure.

For example, in a case where the processor 330 does not receive the interruption signal from the hardware accelerator 320 for a long time, whether the hardware accelerator 320 is in the detection state may be checked. If yes, it indicates that the hardware accelerator 320 involves a case in which no response signal is returned for a long time. In this case, the processor 330 may reset the whole processing system in which the hardware accelerator 320 resides to eliminate the anomaly.

For example, in a case where it is detected that the response signal corresponding to the first acceleration unit is not returned for a long time, the whole processing system in which the hardware accelerator 320 resides may be reset after other acceleration units complete processing of current ongoing tasks. The whole processing system in which the hardware accelerator 320 resides may include apparatuses such as a hardware accelerator, a bus, a processor, and a memory. After the resetting, the task corresponding to the response signal having the anomaly may be reloaded to the hardware accelerator 320.

It needs to be noted that, in the embodiments of the present disclosure, the order of performing the steps of the bus anomaly processing method is not limited. While the performing process of the steps is described above in a particular order, the embodiments of the present disclosure are not limited thereto. The steps in the bus anomaly processing method can be performed in series or in parallel, which may be set according to actual needs. The bus anomaly detecting method may further include more or less steps.

Figure 9:
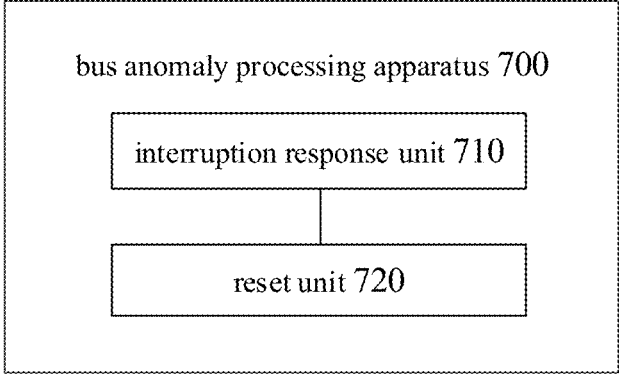
FIG. 9 is a schematic block diagram of a bus anomaly processing apparatus provided in some embodiments of the present disclosure.

At least one embodiment of the present disclosure further provides a bus anomaly processing apparatus. FIG. 9 is a schematic block diagram of a bus anomaly processing apparatus provided in some embodiments of the present disclosure. As shown in FIG. 9, the bus anomaly processing apparatus 700 may include an interruption response unit 710 and a reset unit 720.

The interruption response unit 710 is configured to, in response to receiving an interruption signal sent by the data processing apparatus described in any embodiment of the present disclosure, determine whether bus anomaly information recorded for the data processing apparatus is present. For example, the interruption response unit 710 may perform step S610 of the bus anomaly processing method as shown in FIG. 8.

The reset unit 720 is configured to, in a case where the bus anomaly information recorded for the data processing apparatus is present, reset the data processing apparatus. For example, the reset unit 720 may perform step S620 of the bus anomaly processing method as shown in FIG. 8.

For example, the interruption response unit 710 and the reset unit 720 may be hardware, software, firmware, and any feasible combination thereof. For example, the interruption response unit 710 and the reset unit 720 may be special purpose or general purpose circuits, chips or apparatuses, and may also be a combination of a processor and a memory. The embodiments of the present disclosure have no particular limitation on the specific implementation forms of the interruption response unit 710 and the reset unit 720.

It needs to be noted that, in the embodiments of the present disclosure, the units of the bus anomaly processing apparatus 700 correspond to the steps of the bus anomaly processing method described above. Specific functions of the bus anomaly processing apparatus 700 may be known with reference to the related descriptions regarding the bus anomaly processing method described above, which will not be described here redundantly. The components and structures of the bus anomaly processing apparatus 700 shown in FIG. 9 are merely exemplary and non-limiting. As needed, the bus anomaly processing apparatus 700 may further include other components and structures.

Figure 10:
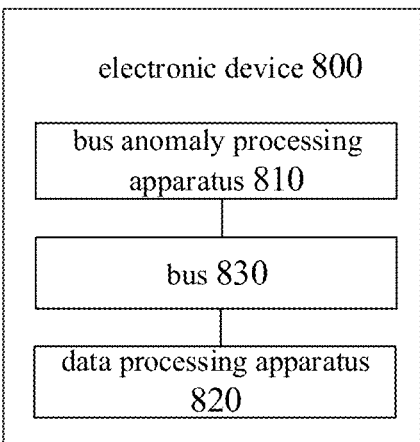
FIG. 10 is a schematic block diagram of a processing system provided in some embodiments of the present disclosure.

At least one embodiment of the present disclosure further provides a processing system. FIG. 10 is a schematic block diagram of a processing system provided in some embodiments of the present disclosure. As shown in FIG. 10, the electronic device 800 may include a bus anomaly processing apparatus 810, a data processing apparatus 820, and a bus 830.

For example, the processing system may be a system on chip (SoC) or may be an electronic device such as a computer and a server.

For example, the bus anomaly processing apparatus 810 may be as described above with respect to the bus anomaly processing apparatus provided in any embodiment, and may be, for example, the bus anomaly processing apparatus 810 may be the processor 330 shown in FIG. 3 and FIG. 5. The data processing apparatus 820 may be as described above with respect to the data processing apparatus provided in any embodiment, and may be, for example, the data processing apparatus 820 may be the hardware accelerator 320 shown in FIG. 3 and FIG. 5.

Figure 11:
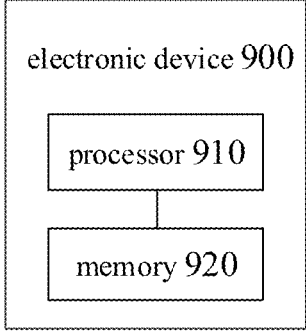
FIG. 11 is a schematic block diagram of an electronic apparatus provided in some embodiments of the present disclosure.

At least one embodiment of the present disclosure further provides an electronic device, FIG. 11 is a schematic block diagram of an electronic device provided by some embodiments of the present disclosure. As shown in FIG. 11, the electronic device 900 includes a processor 910 and a memory 920. The memory 920 is configured to store non-temporary computer readable instructions (e.g., one or more computer program modules). The processor 910 is configured to run the non-temporary computer readable instructions; and the non-temporary computer readable instructions, when run by the processor 910, may execute one or more steps in the video-based information display method as described above. The memory 920 and the processor 910 may be interconnected through a bus system and/or other forms of connection mechanisms (not shown).

For example, the processor 910 may be a Central Processing Unit (CPU), a Digital Signal Processor (DSP), or other form of processing unit having a data processing capability and/or a program execution capability, for example, a Field Programmable Gate Array (FPGA), etc.; for example, the Central Processing Unit (CPU) may be an X86, or ARM architecture, etc. The processor 910 may be a general-purpose processor or a special-purpose processor, and may control other components in the electronic device 900 to execute desired functions.

For example, the memory 920 may include any combination of one or more computer program products; and the computer program products may include various forms of computer readable storage media, for example, a volatile memory and/or a non-volatile memory. The volatile memory may include, for example, a Random Access Memory (RAM) and/or a cache, or the like. The non-volatile memory may include, for example, a Read Only Memory (ROM), a hard disk, an Erasable Programmable Read Only Memory (EPROM), a portable Compact Disk Read Only Memory (CD-ROM), a USB memory, a flash memory, or the like. One or more computer program modules may be stored on the computer readable storage medium, and the processor 910 may run the one or more computer program modules, to implement various functions of the electronic device 900. Various applications and various data, as well as various data used and/or generated by the applications may also be stored on the computer readable storage medium.

It should be noted that in the embodiments of the present disclosure, the above description of the video-based information display method may be referred to for specific functions and technical effects of the electronic device 900, and no details will be repeated here.

Figure 12:
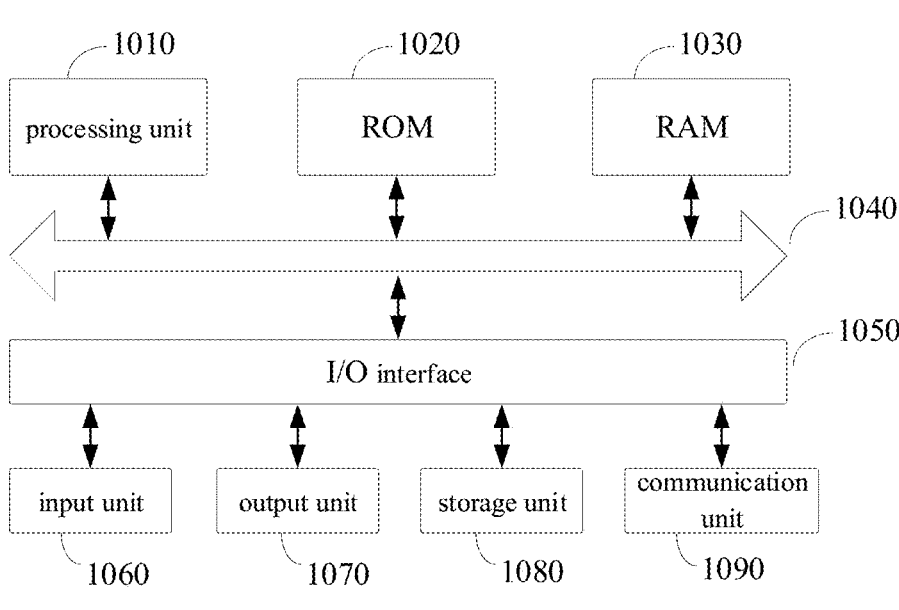
FIG. 12 is a schematic block diagram of another electronic device provided in some embodiments of the present disclosure.

FIG. 12 is a schematic block diagram of another electronic device provided by some embodiments of the present disclosure. The electronic device 1000, for example, is suitable for implementing the video-based information display method provided by the embodiment of the present disclosure. The electronic device 1000 may be a user terminal, or the like. It should be noted that the electronic device 1000 shown in FIG. 12 is only an example and does not impose any limitations on the functionality and scope of use of the embodiments of the present disclosure.

As shown in FIG. 12, the electronic device 1000 may include the processing unit (e.g., a central processing unit (CPU), a graphics processing unit (GPU)) 1010, which may execute various appropriate actions and processing according to programs stored in the read-only memory (ROM) 1020 or programs loaded to the random access memory (RAM) 1030 from the storage unit 1080. A plurality of programs and data required for the operation of the electronic device 1000 are also stored in the RAM 1030. The processing unit 1010, the ROM 1020 and the RAM 1030 are connected with each other through a bus 1040. An input/output (I/O) interface 1050 is also connected to the bus 1040.

In general, the following units may be connected to the I/O interface 1050: an input unit 1060 including a touch screen, a touch pad, a keyboard, a mouse, a camera, a microphone, an accelerometer, a gyroscope or the like; an output unit 1070 including a liquid crystal display (LCD), a loudspeaker, a vibrator or the like; a storage unit 1080 including a magnetic tape and a hard disk; and a communication unit 1090. The communication unit 1090 may allow the electronic device 1000 to communicate wirelessly in a wired manner with other electronic devices to exchange data. Although FIG. 12 shows the electronic device 1000 including a plurality of units, it should be understood that not all the shown units are required to be implemented or included. The electronic device 1000 may alternatively implement or include more or less units.

For example, according to the embodiments of the present disclosure, the video-based information display method may be implemented as computer software programs. For instance, the embodiment of the present disclosure provides a computer program product, which includes computer programs hosted on a non-transient computer readable medium. The computer programs contain program codes for executing the above bus anomaly detecting method and/or the bus anomaly processing method, in such an embodiment, the computer programs may be unloaded and installed from the internet through the communication unit 1090, or installed from the storage unit 1080, or installed from the ROM 1020. The functions defined in the bus anomaly detecting method and/or the bus anomaly processing method provided by the embodiment of the present disclosure are executed when the computer programs are executed by the processing unit 1010.

At least one embodiment of the present disclosure provides a storage medium, configured to store non-temporary computer readable instructions, the non-temporary computer readable instructions, when executed by a computer, implement the bus anomaly detecting method and/or the bus anomaly processing method according to any embodiment of the present disclosure.

Figure 13:
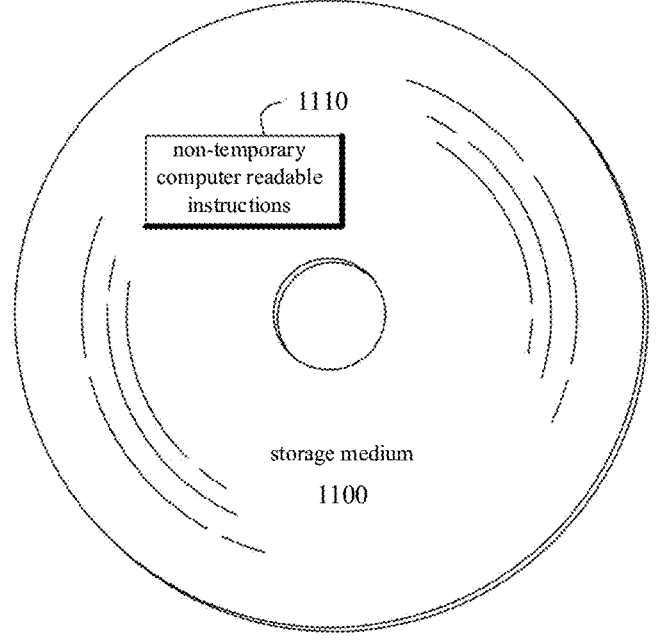
FIG. 13 is a schematic diagram of a storage medium provided in some embodiments of the present disclosure.

FIG. 13 is a schematic diagram of a storage medium provided by some embodiments of the present disclosure. As shown in FIG. 13, the storage medium 1100 is configured to store non-temporary computer readable instructions 1110. For example, the non-temporary computer readable instructions 1110, when executed by a computer, implement one or more steps of the bus anomaly detecting method and/or the bus anomaly processing method according to the foregoing.

For example, the storage medium 1100 may be applied in the electronic device 900 described above. For example, the storage medium 1100 may be the memory 920 in the electronic device 900 shown in FIG. 11. For example, a related description of the storage medium 1100 may be referred to the corresponding description of the memory 920 in the electronic device 900 shown in FIG. 11 and will not be repeated herein.

It should be noted that the above storage medium (computer readable medium) of the present disclosure may be a computer readable signal medium, a non-transitory computer readable storage medium, or any combination of the above. The non-transitory computer readable storage medium, for instance, may be, but not limited to, electrical, magnetic, optical, electromagnetic, infrared, or semiconductor system, device, or equipment, or a combination of the above. A more specific example of the non-transitory computer readable storage medium may include but not limited to: electrical connection having one or more wires, portable computer disk, hard disk, random access memory (RAM), read-only memory (ROM), erasable programmable read-only memory (EPROM), flash memory, optical fiber, portable compact disk read-only memory (CD-ROM), optical storage unit, magnetic storage unit, or any suitable combination of the above. In the present disclosure, the non-transitory computer readable storage medium may be any tangible medium containing or storing programs. The programs may be used by a command execution system, device or unit or used in combination with the command execution system, device or unit. However, in the present disclosure, the computer readable signal medium may include data signals propagated in baseband or as part of carrier, in which computer readable program codes are hosted. The propagated data signals may adopt a plurality of forms, including but not limited to electromagnetic signals, optical signals or any suitable combination of the above. The computer readable signal medium may also be any computer readable medium except the non-transitory computer readable storage medium. The computer readable signal medium can send, propagate or transmit programs used by the command execution system, device or unit or used in combination with the command execution system, device or unit. The program codes contained in the computer readable medium can be transmitted by any appropriate medium, including but not limited to: wire, optical cable, radio frequency (RF) and the like, or any suitable combination of the above.

In some embodiments, the client and the server may communicate by utilization of any network protocol which is currently known or developed in the future such as Hyper Text Transfer Protocol (HTTP), and may be interconnected with digital data communication (e.g., communication network) in any form or medium. The example of the communication network includes local area network (LAN), wide area network (WAN), internet, end-to-end network (e.g., ad hoc end-to-end network), and any network which is current known or developed in the future.

The above computer readable medium may be contained in the above electronic device and may also exist alone and not be assembled into the electronic device.

The above computer readable medium hosts one or more programs. When the above one or more programs are executed by the electronic device, the electronic device is configured to: at an interface for connecting a bus, activate a detection state in response to at least one access initiating apparatus sending an access request to at least one access receiving apparatus so as to, in the detection state, perform anomaly detection on response signal fed back by the at least one access receiving apparatus for each access request, and block an interruption signal sent by the at least one access initiating apparatus with respect to a task corresponding to the access request; in response to the response signal corresponding to at least one access request sent by the at least one access initiating apparatus having an anomaly, terminate the detection state, record bus anomaly information based on the response signal having the anomaly, and send an interruption signal with respect to the response signal having the anomaly; and in a case where the response signal corresponding to each access request sent by the at least one access initiating apparatus is received and has no anomaly, terminate the detection state to stop blocking the interruption signal sent by the at least one access initiating apparatus.

Alternatively, The above computer readable medium hosts one or more programs. When the above one or more programs are executed by the electronic device, the electronic device is configured to: in response to receiving an interruption signal sent by the data processing apparatus according to any one embodiment of the present disclosure, determine whether bus anomaly information recorded for the data processing apparatus is present; and in a case where the bus anomaly information recorded for the data processing apparatus is present, reset the data processing apparatus.

Computer program codes for performing the operations of the present disclosure may be written in one or more programming languages or a combination thereof. The above programming languages include but not limited to object-oriented programming languages such as Java, Smalltalk and C++, and also include conventional procedural programming languages such as "C" language or similar programming languages. The program codes may be completely executed on a user computer, partially executed on the user computer, executed as a separate package, partially executed on the user computer and partially executed on a remote computer, or completely executed on the remote computer or the server. In the case where the remote computer is involved, the remote computer may be connected to the user computer through any kind of network, such as a Local Area Network (LAN) or a Wide Area Network (WAN), or, alternatively, may be connected to an external computer (for instance, connected via the Internet by utilization of Internet service providers).

The flowcharts and the block diagrams in the drawings show possible architectures, functions and operations of the system, the method and the computer program product according to the embodiments of the present disclosure. In this regard, each block in the flowchart or the block diagram may represent a module, a program segment, or a part of code. The module, the program segment, or the part of the code contains one or more executable instructions for implementing specified logic functions. It should be also noted that in some alternative implementations, the functions marked in the blocks may also occur in a different order from those marked in the drawings. For instance, two consecutive blocks may actually be executed basically in parallel, and sometimes, may also be executed in a reverse order, determined by involved functions. It should be also noted that each block in the block diagram and/or the flowchart and the combination of the blocks in the block diagram and/or the flowchart may be implemented by a dedicated hardware-based system that performs a specified function or operation, and may also be implemented by the combination of a special hardware and computer instructions.

Units involved in the embodiments of the present disclosure may be implemented by software, and may also be implemented by hardware. Wherein, the name of the unit should not define the unit under certain circumstances.

The functions described above in this document may be at least partially executed by one or more hardware logical units. For instance, without limitation, demonstration type hardware logical units that may be used include: field programmable gate array (FPGA), application-specific integrated circuit (ASIC), application specific standard parts (ASSP), system on a chip (SOC), complex programmable logic device (CPLD), etc.

In the present disclosure, the machine readable medium may be a tangible medium and may include or store programs used by command execution system, device or equipment or used in combination with the command execution system, device or equipment. The machine readable medium may be a machine readable signal medium or a machine readable storage medium. The machine readable medium may include but not limited to electronic, magnetic, optical, electromagnetic, infrared, or semiconductor system, device or equipment, or any suitable combination of the above. A more specific example of the machine readable storage medium may include electrical connection based on one or more wires, portable computer disk, hard disk, Random Access Memory (RAM), Read Only Memory (ROM), Erasable Programmable Read Only Memory (EPROM), flash memory, optical fiber, Convenient Compact Disk Read Only Memory (CD-ROM), optical storage unit, magnetic storage unit, or any suitable combination of the above.

The above description is only the explanation of a partial embodiment of the present disclosure and the used technical principle. It should be understood by those skilled in the art that the disclosure scope involved in the disclosure is not limited to the technical solution formed by the specific combination of the above technical features, but also covers other technical solutions formed by any combination of the above technical features or their equivalent features without departing from the above disclosed concept. For example, the technical solution formed by replacing the above features with (but not limited to) technical features with similar functions disclosed in the disclosure.

In addition, although the operations are depicted in a specific order, this should not be understood as requiring these operations to be performed in the specific order shown or in a sequential order. Under certain circumstances, multitasking and parallel processing may be beneficial. Similarly, although several specific implementation details are included in the above discussion, these should not be interpreted as limiting the scope of the present disclosure. Some features described in the context of separate embodiments may also be implemented in a single embodiment in combination. On the contrary, various features described in the context of a single embodiment may also be implemented in a plurality of embodiments alone or in any suitable subcombination.

Although the subject matter has been described in language specific to structural features and/or logical actions of methods, it should be understood that the subject matter defined in the appended claims is not necessarily limited to the specific features or actions described above. On the contrary, the specific features and actions described above are only example forms of realizing the claims.

The invention claimed is:

1. A bus anomaly detecting method, comprising:
at an interface for connecting a bus, activating a detection state in response to at least one access initiating apparatus sending an access request to at least one access receiving apparatus so as to, in the detection state, perform anomaly detection on response signal fed back by the at least one access receiving apparatus for each access request, and block a first interruption signal sent by the at least one access initiating apparatus with respect to a task corresponding to the access request, wherein the first interruption signal is used to inform a processor through the bus that the at least one access initiating apparatus has completed the task corresponding to the access request;
in response to the response signal corresponding to at least one access request sent by the at least one access initiating apparatus having an anomaly, terminating the detection state, recording bus anomaly information based on the response signal having the anomaly, and sending a second interruption signal with respect to the response signal having the anomaly, wherein the second interruption signal is used to inform the processor of processing the anomaly of the at least one access initiating apparatus; and
in a case where the response signal corresponding to each access request sent by the at least one access initiating apparatus is received and has no anomaly, terminating the detection state to stop blocking the first interruption signal sent by the at least one access initiating apparatus.

2. The bus anomaly detecting method according to claim 1, wherein the at least one access initiating apparatus comprises at least one acceleration unit of a hardware accelerator.

3. The bus anomaly detecting method according to claim 2, wherein
the bus comprises a first channel for transmitting a write request, a second channel for transmitting data to be written, a third channel for transmitting response signal corresponding to the write request, a fourth channel for transmitting a read request, and a fifth channel for transmitting response signal corresponding to the read request; and
the perform anomaly detection on response signal fed back by the at least one access receiving apparatus for each access request comprises: perform anomaly detection on response signals of the third channel and the fifth channel.

4. The bus anomaly detecting method according to claim 2, wherein each access initiating apparatus corresponds to an anomaly recording memory; and
the recording bus anomaly information based on the response signal having the anomaly comprises:
determining an access initiating apparatus corresponding to the response signal having the anomaly as a target access initiating apparatus; and
writing an anomaly parameter to an anomaly recording memory corresponding to the target access initiating apparatus to characterize the occurrence of an anomaly in the response signal corresponding to the access request sent by the target access initiating apparatus.

5. The bus anomaly detecting method according to claim 2, wherein the activating a detection state in response to at least one access initiating apparatus sending an access request to at least one access receiving apparatus comprises:

in an idle state, in response to the at least one access initiating apparatus sending the access request to the at least one access receiving apparatus, transitioning to the detection state;

in a case where the response signal corresponding to each access request sent by the at least one access initiating apparatus is received and has no anomaly, terminating the detection state comprises:

in a case where the response signal corresponding to each access request sent by the at least one access initiating apparatus is received and has no anomaly, terminating the detection state and returning to the idle state.

6. The bus anomaly detecting method according to claim 1, wherein the bus comprises a first channel for transmitting a write request, a second channel for transmitting data to be written, a third channel for transmitting response signal corresponding to the write request, a fourth channel for transmitting a read request, and a fifth channel for transmitting response signal corresponding to the read request; and the perform anomaly detection on response signal fed back by the at least one access receiving apparatus for each access request comprises: perform anomaly detection on response signals of the third channel and the fifth channel.

7. The bus anomaly detecting method according to claim 6, wherein the response signal corresponding to the access request having an anomaly comprises:

the response signal triggers an anomaly due to an access address of the access request not meeting a requirement; and/or the response signal triggers an anomaly due to data read by the at least one access receiving apparatus in response to the read request having an error.

8. The bus anomaly detecting method according to claim 1, wherein each access initiating apparatus corresponds to an anomaly recording memory; and the recording bus anomaly information based on the response signal having the anomaly comprises:

determining an access initiating apparatus corresponding to the response signal having the anomaly as a target access initiating apparatus; and writing an anomaly parameter to an anomaly recording memory corresponding to the target access initiating apparatus to characterize the occurrence of an anomaly in the response signal corresponding to the access request sent by the target access initiating apparatus.

9. The bus anomaly detecting method according to claim 1, wherein the activating a detection state in response to at least one access initiating apparatus sending an access request to at least one access receiving apparatus comprises:

in an idle state, in response to the at least one access initiating apparatus sending the access request to the at least one access receiving apparatus, transitioning to the detection state;

in a case where the response signal corresponding to each access request sent by the at least one access initiating apparatus is received and has no anomaly, terminating the detection state comprises:

in a case where the response signal corresponding to each access request sent by the at least one access initiating apparatus is received and has no anomaly, terminating the detection state and returning to the idle state.

10. A data processing apparatus, comprising:

at least one data processing unit configured to send an access request to at least one storage apparatus based on a received task; and a bus anomaly detecting apparatus, that is configured to:

at an interface for connecting a bus, activate a detection state in response to at least one access initiating apparatus sending an access request to at least one access receiving apparatus so as to, in the detection state, perform anomaly detection on response signal fed back by the at least one access receiving apparatus for each access request, and block a first interruption signal sent by the at least one access initiating apparatus with respect to a task corresponding to the access request, wherein the first interruption signal is used to inform a processor through the bus that the at least one access initiating apparatus has completed the task corresponding to the access request;

in response to the response signal corresponding to at least one access request sent by the at least one access initiating apparatus having an anomaly, terminate the detection state, record bus anomaly information based on the response signal having the anomaly, and send a second interruption signal with respect to the response signal having the anomaly, wherein the second interruption signal is used to inform the processor of processing the anomaly of the at least one access initiating apparatus; and in a case where the response signal corresponding to each access request sent by the at least one access initiating apparatus is received and has no anomaly, terminate the detection state to stop blocking the first interruption signal sent by the at least one access initiating apparatus.

11. The data processing apparatus according to claim 10, wherein the data processing apparatus comprises a hardware accelerator; and each of the at least one data processing unit comprises an acceleration unit.

12. The data processing apparatus according to claim 11, further comprising:

a data memory configured to store computational data of the at least one data processing unit; and a check unit configured to check and correct data output by the data memory.

13. A bus anomaly processing method, comprising:

in response to receiving the second interruption signal sent by the data processing apparatus according to claim 10, determining whether bus anomaly information recorded for the data processing apparatus is present; and in a case where the bus anomaly information recorded for the data processing apparatus is present, resetting the data processing apparatus.

14. The bus anomaly processing method according to claim 13, further comprising:

in response to not receiving the second interruption signal sent by the data processing apparatus within a predetermined duration, checking whether a current state of a bus anomaly detecting apparatus of the data processing apparatus is a detection state; and in a case where the current state of the bus anomaly detecting apparatus of the data processing apparatus is the detection state, resetting a processing system in which the data process apparatus resides.

15. The bus anomaly processing method according to claim 13, wherein the resetting the data processing apparatus comprises:

resetting the data processing apparatus after the data processing unit of the data processing apparatus completes a current task; and after the resetting, reloading a task corresponding to the response signal having an anomaly to the data processing apparatus.

16. A processing system, comprising:

a bus;

the data processing apparatus according to claim 10; and a bus anomaly processing apparatus, that is configured to:

in response to receiving the second interruption signal sent by the data processing apparatus, determine whether bus anomaly information recorded for the data processing apparatus is present; and in a case where the bus anomaly information recorded for the data processing apparatus is present, reset the data processing apparatus.

17. An electronic device, comprising:

a processor; and a memory storing at least one computer program module;

wherein the at least one computer program module is configured to be executed by the processor to implement the bus anomaly detecting method according to claim 1.

18. A non-transitory computer-readable storage medium, storing non-transitory computer-readable instructions which, when executed by a computer, cause implementing the bus anomaly detecting method according to claim 1.

19. An electronic device, comprising:

a processor; and a memory storing at least one computer program module;

wherein the at least one computer program module is configured to be executed by the processor to implement the bus anomaly processing method according to claim 13.

20. A non-transitory computer-readable storage medium, storing non-transitory computer-readable instructions which, when executed by a computer, causes implementing the bus anomaly processing method according to claim 13.

* * * * *